United States Patent [19]

Warrick

[11] Patent Number: 4,753,263

[45] Date of Patent: Jun. 28, 1988

[54] ELECTROHYDRAULIC REGULATING VALVES

[75] Inventor: Frank G. Warrick, Horton, Mich.

[73] Assignee: Sealed Power Corporation, Muskegon, Mich.

[21] Appl. No.: 91,388

[22] Filed: Aug. 31, 1987

[51] Int. Cl.$^4$ ............................................. G05D 16/10
[52] U.S. Cl. ................................ 137/116.5; 137/627.5
[58] Field of Search ........................... 137/116.5, 627.5

[56] References Cited

U.S. PATENT DOCUMENTS

| | | | |
|---|---|---|---|
| 3,906,982 | 9/1975 | Fleischhacker | 137/116.5 |
| 4,171,004 | 10/1979 | Cerrato et al. | 137/116.5 X |
| 4,598,729 | 7/1986 | Naito et al. | 137/116.5 |

Primary Examiner—Arnold Rosenthal
Attorney, Agent, or Firm—Barnes, Kisselle, Raisch, Choate, Whittemore & Hulbert

[57] ABSTRACT

A pressure regulating valve which will give a constant pressure output comprises a housing of soft magnetic material such as low carbon steel, an armature of soft magnetic carbon steel in the housing and having an outlet exhaust passageway therethrough provided with an exhaust port, an inlet for the fluid the pressure of which is regulated, a valve seat in the inlet passageway, a dual headed valve, preferably non-magnetic, one head of which coacts with the valve seat to control the inlet and the other head of which controls the exhaust port, an electrical coil for generating a magnetic flux acting on the armature with a force urging the armature inwardly of the housing in opposition to the force of the inlet fluid acting against the dual headed valve and the inner end of the armature urging the armature and valve outwardly, the valve moving with the armature to vary the gap between the valve head and valve seat in the inlet passageway whereby the output pressure is directly a function of the coil current and the resulting magnetic force acting on the armature.

6 Claims, 1 Drawing Sheet

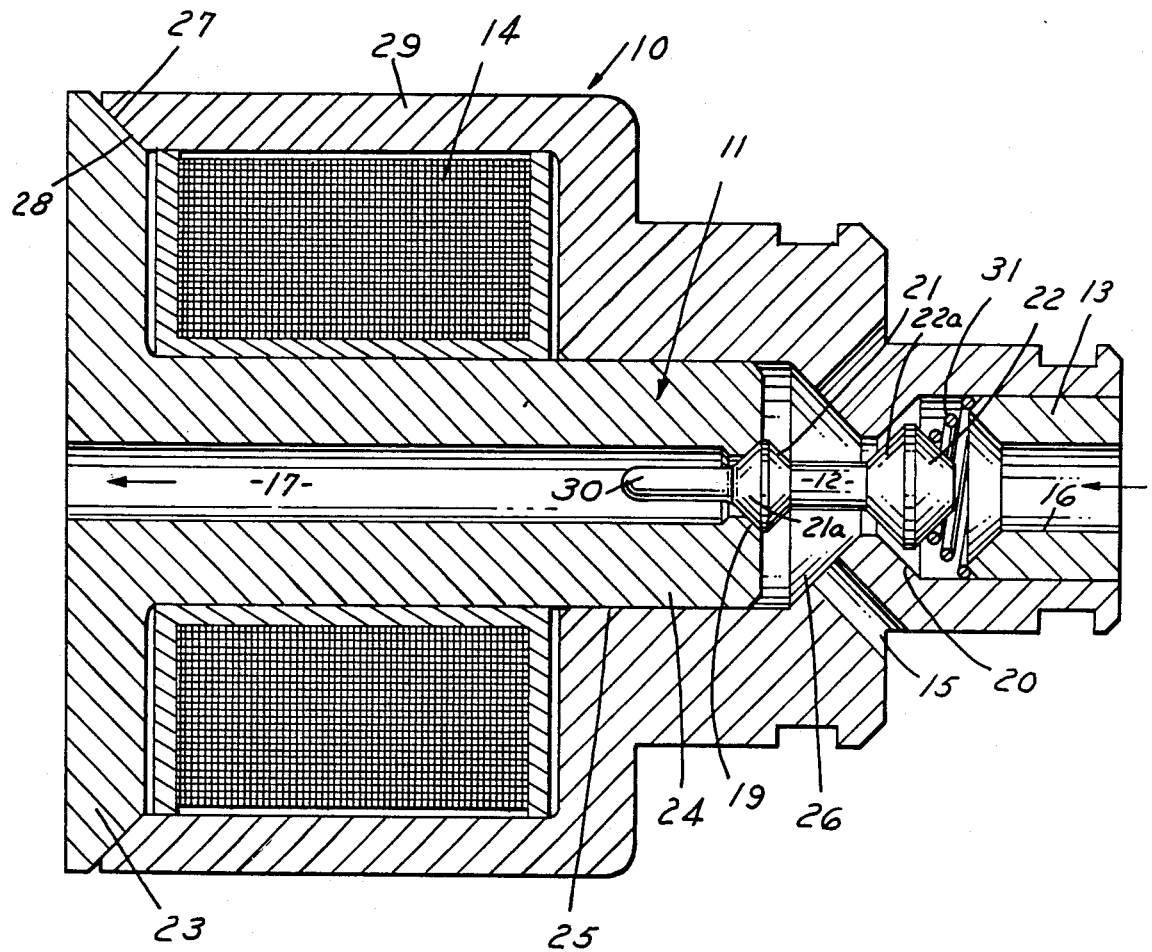

ELECTROHYDRAULIC REGULATING VALVES

BACKGROUND AND SUMMARY OF THE INVENTION

Electrohydraulic valves utilizing spaced sealing surfaces associated with spaced seats are shown, for example, in U.S. Pat. Nos. 389,098, 2,267,515 and 2,934,090.

Among the objectives of the present invention are to provide an electrohydraulic valve that provides a constant pressure output from a higher and variable pressure input, that is of simple structure and easily upscaled to larger flows and pressures, and which functions in an analog manner and is relatively slow so that high and low momentum is not a consideration.

In accordance with the invention, the electrohydraulic regulating valve comprises a housing, an armature slidable therein for controlling an inlet port valve, a coil surrounding the armature, an inlet port for the fluid the pressure of which is to be regulated, an outlet port to the device acted on by the regulated fluid, a valve for controlling the inlet port, the magnetic flux created when the coil is energized acting on the armature urging the armature inwardly of the housing in opposition to the inlet fluid pressure acting on the valve and armature to vary the gap between the valve and the inlet port so that the output pressure is directly a function of the coil current and resulting magnetic force acting on the armature.

DESCRIPTION OF THE DRAWING

The drawing is a longitudinal cross sectional view showing the electrohydraulic regulating valve.

DETAILED DESCRIPTION

The electrohydraulic flow regulating valve embodying the invention comprises a housing 10 of a suitable soft magnetic material such as low carbon steel, an armature 11 also of soft magnetic low carbon steel and a dual headed valve 12 preferably non-magnetic. The housing includes an axial inlet member 13 at one end. An electrical coil 14 surrounds the armature 11 within housing 10 for generating magnetic flux. Outlet openings 15 in housing extend at an angle from adjacent the end of armature 11 to the exterior for supplying pressure fluid to the device being controlled by the regulating valve. An inlet opening 16 is provided in member 13 for the fluid or liquid the pressure of which is regulated. An axial exhaust opening or passageway 17 is provided in armature stem 24 and extends to a bevelled exhaust port seat 19 on stem 24. A bevelled frustoconical regulating seat area 20 is provided in housing 10. Valve 12 has spaced interconnected frustoconical heads 21, 22. Valve outlet head 21 of valve 12 controls the exhaust port seat 19 and valve inlet head 22 controls the regulating seat area 20.

As shown in the drawing, armature 11 is T-shaped in cross-section, having a head 23 of large diameter and a stem portion 24 of smaller cylindrical diameter portion 25 which projects into the housing 10. The small diameter portion 25 of armature 11 is in sliding engagement with the housing 10. A cavity 26 is provided in the housing at the inner end of the stem 11. Valve 12 controls the flow of fluid into the cavity 26 through a frustoconical sealing surface 22a on inlet heat 22 and inlet seat area 20 and flow out of the cavity through a sealing surface 21a on outlet head 21 and exhaust port seat 19 when the coil is de-energized.

Valve 21 includes an integral axial extension 30 extending from head 21. A conical compression spring 31 is interposed between the valve inlet head 22 and the end of inlet member 13 and urges the dual head valve to hold the sealing surface of 21a of outlet head 21 against seat 19. Extension 30 and spring 31 function to improve the stability and positioning between the valve heads 21, 22 and seats 19, 20.

As the armature 11 slides axially outward from the housing 10, an air gap will be created between bevelled surfaces 27, 28 of head 23 of the armature 11 and the wall 29 of housing 10. Also as the armature 11 moves outward (to the left), the valve 12 will move with it and valve head 22 cooperates with port seat 20 to reduce and eventually stop the flow through seat area 20. Once the valve head 22 comes to rest on seat area 20, further outward movement of the armature 11 will open seat exhaust port seat 19 allowing fluid to escape from the device being controlled through pressure ports 15, cavity 26, and exhaust opening 19.

In operation, assuming no current is being applied to coil 14, pressurized fluid from inlet opening 16 will exert an outward force on the armature 11 and valve 12 causing movement of both heads to the left until head 22 of the valve seats on the regulating seat 20 and valve head 21 seats on exhaust port seat 19 thereby closing exhaust passageway 17. As long as the coil 14 is not energized the pressurized fluid from inlet opening 16, acting on valve head 22, will cause head 21 to seat against seat 19 and close exhaust opening 17. This movement will create an air gap at surfaces 27, 28 between armature head 23 and the end of housing 10. As long as the coil 14 is not energized the pressurized fluid from inlet opening 17, acting on valve head 22, will cause head 22 to seat against and close regulating seat 20.

To regulate a given amount of fluid pressure at pressure apply ports 15, a current of the desired amperage is applied to coil 14 creating a magnetic field through the armature and housing and across the air gap at 27, 28. This magnetic field across the air gap 27, 28 will create an inward or rightward force on the armature which is applied to valve 12 seated against exhaust seat 19. When this force exceeds the force of the fluid from inlet opening 16 acting on the head 22 of the valve, the valve head 22 will lift off the regulating seat 20 forming a gap between sealing surface 22a and seat 20 allowing pressure fluid to flow into the cavity 26 and out through the apply ports 15 to the device being controlled by the regulating valve. The fluid pressure in cavity 26 acting on outlet ports 15 also acts on the end of the small diameter stem 24 of the armature 11 exerting an outward or leftward force. When there is a gap between sealing surface 22a and seat 20, the fluid pressure acts against head 22 and the end of armature stem 24 in opposition to the force of the energized coil 14 urging armature 11 to the right. The imbalance in these forces causes armature movement in a direction to balance these forces at which point the output pressure will be constant. Then if the inlet pressure of the fluid or liquid increases and causes an incipient increase in output pressure the higher pressure acts on the end of the armature stem 24 and valve head 22 and forces them outward against the magnetic force until the gap between the sealing surface 22a of the valve 12 and the seat 20 is reduced thereby reducing fluid flow and thereby reducing the output pressure enough to again balance the fluid pressure and magnetic forces while the output pressure remains constant. As long as there is a gap between sealing surface 22a and seat 20, head 21 will be seated against seat 19 and close opening 17.

If the inlet pressure is reduced, the outlet pressure begins to fall and the magnetic force moves the armature 11 to the right which in turn moves valve 12 to the right and opens the regulating area 20 until the forces again balance maintaining a constant pressure output. Changes in output back pressure also will have a like effect on the force balance and the armature and valve will move to a balanced position depending on the coil current to maintain a constant output pressure.

From the above it is apparent that output pressure is directly a function of the coil current and the resulting magnetic force in the air gap across surfaces 27, 28. Once the coil current is set for a given output pressure the device will maintain that output pressure independent of input pressure or output back pressure until the coil current is changed or the input pressure falls below the desired output pressure.

When the current to the coil is shut off, residual pressure from the device connected to the outlet openings 15 will force the armature out until the exhaust seat 19 opens, at which point the residual pressure will vent to exhaust and depressurize the device. During the operation of this pressure regulating valve, as long as the valve is operating to regulate or maintain the pressure of the fluid passing out through outlet port 15, valve head 21 will close the exhaust seal 19 and the clearance between the valve head 22 and the regulating seat 20 will determine the pressure to which the fluid from opening 16 will be lowered or regulated before passing out through passageways 15.

I claim:

1. An electrohydraulic valve assembly comprising
 a housing,
 an electrical coil in said housing,
 an armature,
 an electrical coil in said housing surrounding said armature,
 said armature being slidable within the housing to create an air gap between the housing and the armature whereby when a current is applied to the coil a magnetic field is created through the armature and housing and across the air gap creating a force drawing the armature inwardly of the housing,
 said housing defining a cavity in the housing adjacent the inner end of the armature,
 said housing having an inlet into said cavity for fluid under pressure,
 said armature having a fluid exhaust opening from said cavity,
 said housing having an outlet from said cavity for supplying regulated pressure fluid,
 said housing having a regulating seat associated with said inlet,
 said armature having an exhaust port seat associated with said exhaust opening,
 a valve having a valve inlet head associated with the regulating seat for controlling said inlet and a valve outlet head spaced longitudinally from said valve inlet head and associated with the exhaust port seat for controlling said exhaust opening whereby and when no current is applied to the coil pressurized fluid from the inlet will move the valve and armature until the valve inlet head seats on the regulating seat and the valve outlet head seats on the exhaust port seat closing exhaust opening and creating an air gap between the housing and the armature and when a predetermined current is applied to the coil creating a magnetic field through the armature and housing and across the air gap the magnetic field will create an inward force on the armature in opposition to the inlet fluid pressure applying a force to the valve inlet head tending to seat the same and in opposition to the fluid pressure in the cavity acting against said armature tending to move the armature outwardly until the regulating seat area into the cavity is reduced reducing fluid flow and thereby reducing pressure to balance the pressure and magnetic forces while the output pressure remains constant.

2. The electrohydraulic regulating valve claimed in claim 1 wherein the armature has a small diameter portion surrounded by the coil and slidable in the housing, and a large diameter portion coacting with the end of trhe housing to provide an air gap.

3. The electrohydraulic regulating valve set forth in claim 1 wherein the valve for controlling the inlet has a head subjected to the pressure of the fluid the pressure of which is being regulated, such pressure acting against the valve in a direction tending to close the inlet.

4. The electrohydraulic valve set forth in claim 3 wherein the end face of the small diameter portion of the armature is subject to the pressure of the fluid entering the housing through the inlet.

5. The electrohydraulic valve set forth in claim 4 wherein the armature is provided with an exhaust port and the valve is provided with a head seated against and closing the exhaust when the coil is energized and the armature has moved the valve to provide a gap between the inlet head of the valve and the inlet.

6. An electrohydraulic regulating valve comprising
 a housing having an inlet for the fluid the pressure of which is being regulated and an outlet for the regulated fluid,
 a valve for controlling the inlet and outlet,
 an armature slidable in the housing and having a surface subjected to the pressure of the fluid between the inlet and outlet,
 a coil surrounding the armature such that the magnetic flux created when the coil is energized acting on the armature and urging the armature inwardly of the housing in opposition to the pressure of the fluid entering the housing through the inlet, the armature contacts and moves the valve away from the inlet whereby the magnetic force acting on the armature opposes the force of the inlet fluid pressure acrting on the valve and armature to vary the gap between the valve and the inlet and thereby regulate the output fluid pressure as a function of the magnetic force acting on the armature.

* * * * *